United States Patent [19]

Mochizuki et al.

[11] Patent Number: 4,903,173
[45] Date of Patent: Feb. 20, 1990

[54] HEADLIGHT DEVICE

[75] Inventors: Kazuo Mochizuki; Manabu Takada, both of Shimizu, Japan

[73] Assignee: Koito Seisakusho Co., Ltd., Tokyo, Japan

[21] Appl. No.: 209,328

[22] Filed: Jun. 20, 1988

[30] Foreign Application Priority Data

Apr. 5, 1988 [JP] Japan .................................. 63-83897

[51] Int. Cl.4 ............................................. F21V 7/16
[52] U.S. Cl. ..................... 362/66; 362/240; 362/241; 362/282
[58] Field of Search ...................... 362/61, 66, 80, 240, 362/241, 297, 346, 69, 70, 282

[56] References Cited

U.S. PATENT DOCUMENTS

| 4,019,045 | 4/1977 | Bassett | 362/226 |
| 4,198,674 | 4/1980 | Ilhage et al. | 362/240 X |
| 4,644,448 | 2/1987 | Heiler | 362/66 |
| 4,675,793 | 6/1987 | Capellari et al. | 362/66 |
| 4,679,125 | 7/1987 | Dick | 362/66 |
| 4,722,033 | 1/1988 | Van Duyn et al. | 362/80 |

FOREIGN PATENT DOCUMENTS

| 2916970 | 10/1979 | Fed. Rep. of Germany | 362/241 |
| 266054 | 7/1929 | Italy | 362/241 |
| 389537 | 7/1965 | Switzerland | 362/240 |

Primary Examiner—Ira S. Lazarus
Assistant Examiner—Peggy Neils
Attorney, Agent, or Firm—Koda & Androlia

[57] ABSTRACT

A headlight device comprising a main reflective mirror associated with a main light source, an auxiliary light source mounted adjacent to one side edge of the main reflective mirror, and a lens covering the front side of the two light sources. The one side edge of the main reflective mirror is formed and located such that the light emitted from the auxiliary light source toward the main reflective mirror is not shielded by the one side edge of the main reflective mirror so that the light emitted from the auxiliary light source is irradiated through at least a substantial part of the reflective mirror. The part being located remote from the auxiliary light source.

3 Claims, 6 Drawing Sheets

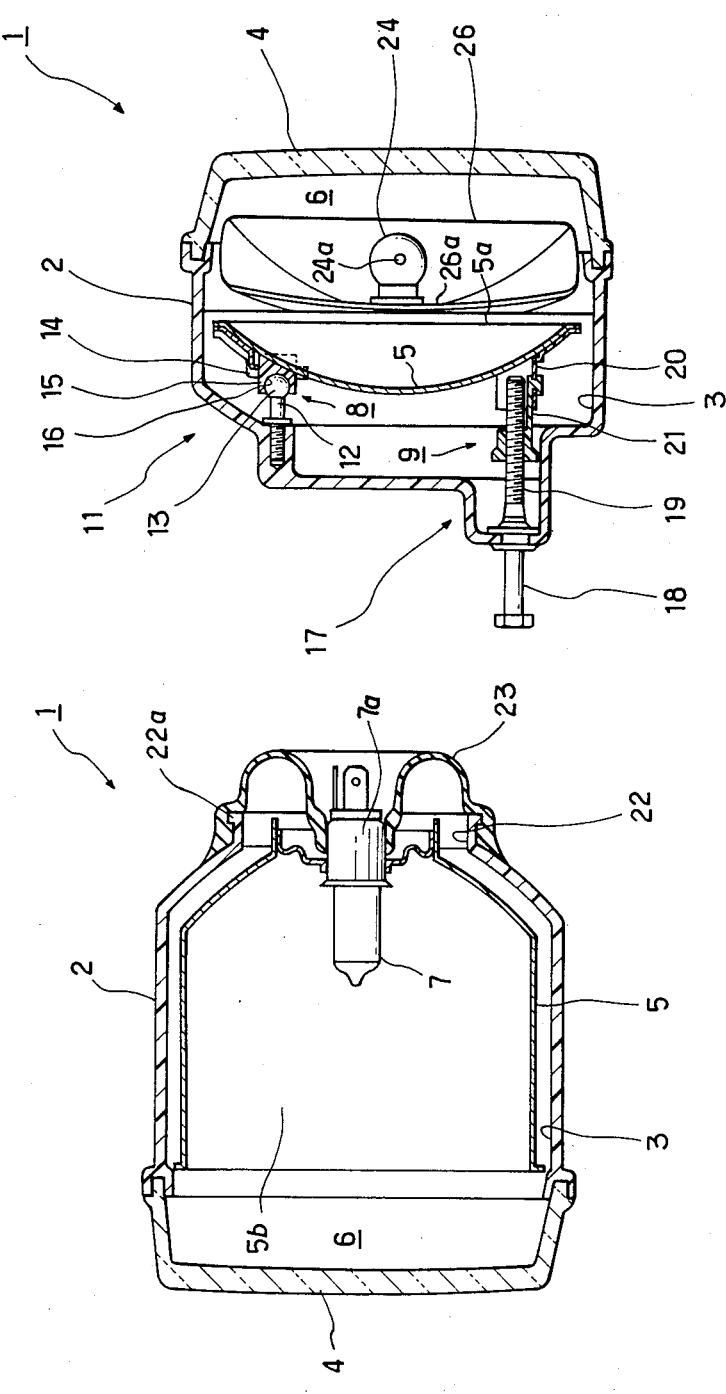

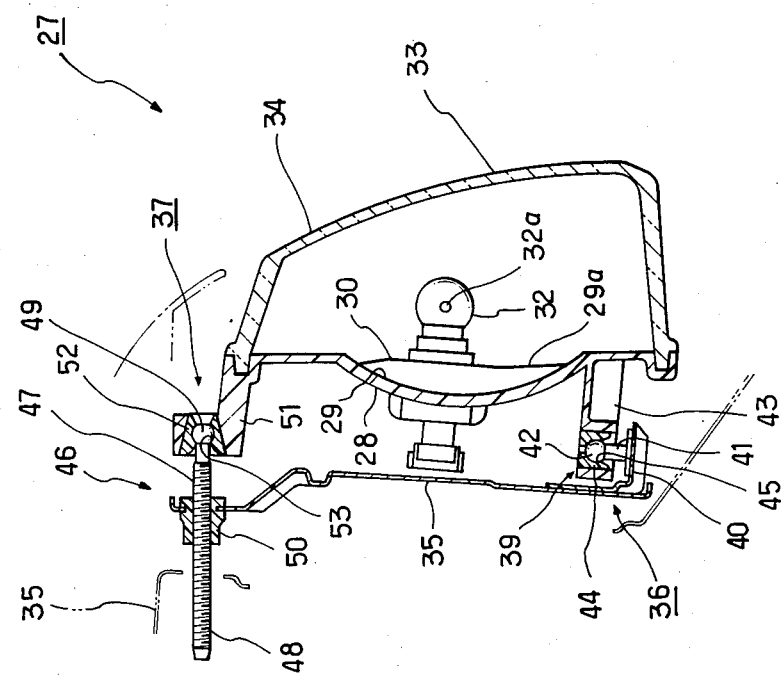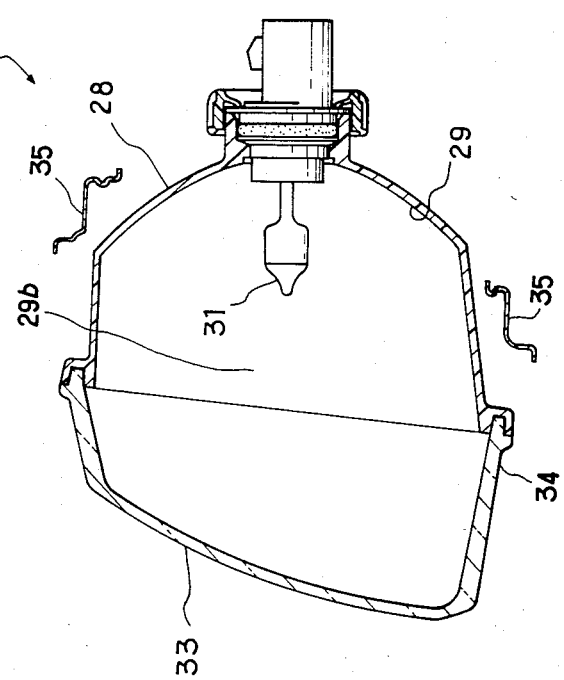

HEADLIGHT DEVICE

FIELD OF THE INVENTION

The present invention relates to a headlight device for use in a vehicle such as an automobile and the like and, particularly to a headlight device incorporating an auxiliary light source such as a fog lamp and the like.

DESCRIPTION OF PRIOR ART

There are various headlight devices having a main light source and an auxiliary light source such as a fog lamp, a clearance lamp and the like.

When an auxiliary light source is provided in addition to a main light source, and when respective light sources have respective reflective mirrors for directing the light beam of respective light sources in the forward direction, the headlight device becomes bulky. When the size of the headlight device is restricted, the intensity of the light beam is restricted.

SUMMARY OF THE INVENTION

An object of the present invention is to overcome the shortcomings in the prior art devices and, according to the invention, there is provided a headlight device comprising a main reflective mirror associated with a main light source, an auxiliary light source mounted adjacent to one side edge of the main reflective mirror, and a lens covering the front side of the two light sources. The one side edge of the main reflective mirror adjacent to the auxiliary light source is located such that the light emitted from the auxiliary light source toward a portion near to the other side edge of the main reflective mirror, which is located remote from the auxiliary light source, is not shielded by the one side edge of the main reflective mirror.

Therefore, the light emitted from the auxiliary light source is irradiated through substantially the entire surface of the lens. And it is possible to reduce the size of or to omit the reflective mirror of auxiliary light source, and to increase the size of the reflective mirror of the main light source. The overall size of the headlight device can also be reduced.

BRIEF DESCRIPTION OF THE DRAWINGS

Further objects and advantages of the invention will become apparent from the following detailed description in conjunction with accompanying drawings, in which:

FIG. 3 is a section view taken along line III—III in FIG. 1;

FIG. 4 is a section view taken along line IV—IV in FIG. 1;

FIG. 7 is a section view taken along line VII—VII in FIG. 5, and

FIG. 8 is a section view taken along line VIII—VIII in FIG. 5.

DETAILED DESCRIPTION OF PREFERRED EMBODIMENTS

Figure 1:
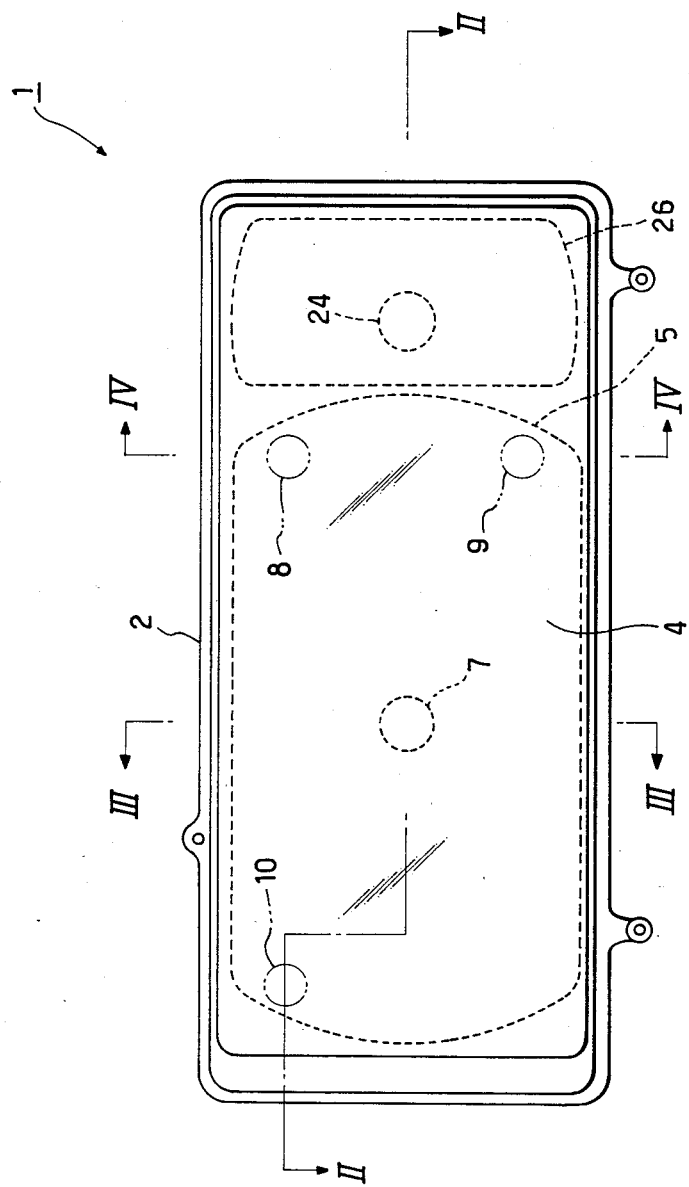
FIG. 1 is a front view of a headlight device according to a first embodiment of the present invention.

FIG. 1–FIG. 4 show a headlight device 1 according to a first embodiment of the invention, which comprises a lamp body 2 formed of a synthetic resin material and defining a recess 3 opening in the forward direction. The front end of the lamp body 2 is covered by a lens 4 formed of a transparent material such as transparent synthetic resin, glass and the like to have a desired optical property.

A main reflective mirror 5 is movably mounted on the lamp body 2 and in a lamp space 6 which is defined between the lamp body 2 and the lens 4. The mirror 5 supports a main light source or an electric bulb 7.

The main reflective mirror 5 is connected to the lamp body 2 at three points 8, 9 and 10. As shown in FIG. 1, the point 8 is located near to the upper right corner of the mirror 5, the point 9 aligns vertically with the point 8 and is located near to the lower edge, and the point 10 aligns horizontally with the point 8 and is located near to the left end of the lamp body 2. The lamp body 2 and the reflective mirror 5 are connected, at the point 8 through a rotary supporting mechanism 11, and at the points 9 and 10 through aiming mechanisms 17 and 17' respectively.

The rotary supporting mechanism 11 comprises, as shown in FIG. 4, a supporting shaft 12 the rear end portion of which being secured to the lamp body 2 and having on the front end a spherical body 13 integrally. The spherical body 13 is rotatably received in a spherical recess 16 of a socket 15 which is formed of a synthetic resin material and is supported on a bracket 14. The bracket 14 is secured to the rear surface of the main reflective mirror 5. The point 8 is defined by the center of the spherical body 13.

The aiming mechanism 17 at the point 9 comprises, as shown in FIG. 4, an adjusting rod 18. The adjusting rod 18 extends in the front and rear directions and has a lengthwise intermediate portion rotatably supported on the rear wall of the lamp body 2, and a screw-thread portion 19 on the front portion. The portion 19 engages screw-threadingly with a nut 21 which is formed of a synthetic resin material and is supported on a bracket 20. The bracket 20 is secured to the rear surface of the main reflective mirror 5.

When the adjusting rod 18 is rotated, the screw-thread portion 19 moves the nut 21 in the direction of front or rear according to the rotational direction of the rod 18. The adjusting rod 18 is mounted on the lamp body 2 not to move axially so that the reflective mirror 5 inclines around a line connecting the points 8 and 10.

The aiming mechanism 17' provided at the point 10 is substantially similar to the aiming mechanism 17, thus, detailed description therefor is omitted, ad the same reference numerals affixed with the prime depict the corresponding parts. (FIG. 2)

Figure 2:
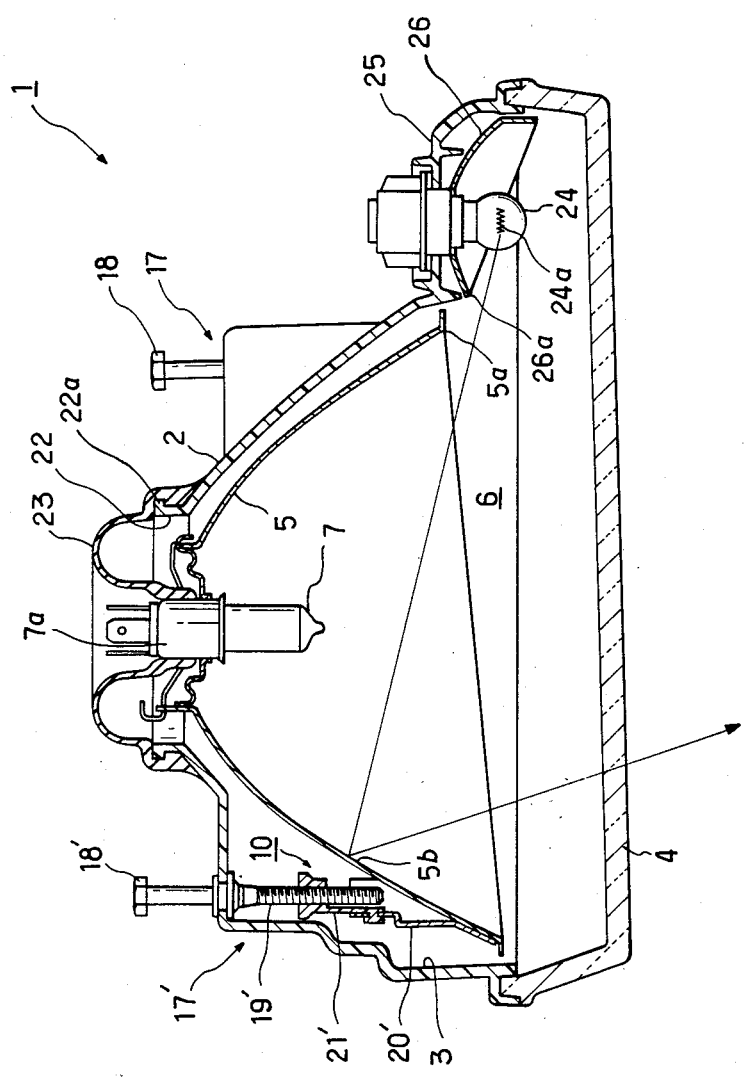
FIG. 2 is a section view taken along line II—II in FIG. 1.

As shown in FIGS. 2 and 3, an opening 22 is formed in the rear side of the lamp body 2, and a portion of the rear end or a socket 7a of the electric bulb 7 extend through the opening 22 with a sufficient clearance. A rubber cap or cover 23 is mounted between the socket 7a and the circumference of the opening 22 to close the opening 22. A rim or circumferential ridge 22a is formed on the circumference of the opening 22 for retaining the outer circumference of the rubber cover 23.

Shown at 24 is an electric bulb as a light source of a clearance lamp, and constitutes the auxiliary light source according to the invention. A reflective mirror 26 is fixedly mounted on a mounting portion 25. The clearance lamp 24 may be substituted by a fog lamp or the like.

The reflective mirror 26 is formed such that a side edge 26a located adjacent to the main reflective mirror 5 is located rearward as compared with the opposite side. Namely, the side edge 26a is, as shown in FIG. 2, spaced from the lens 4 by an amount larger than that of the opposite side which is located adjacent to the outer periphery of the lamp body 2. Further, the reflective mirror 5 is also formed such that a side edge 5a near to the reflective mirror 26 is, as compared with the opposite side edge which is remote from the mirror 26, located rearward (upward in FIG. 2). Whereby, the light emitted from the filament 24a of the fog lamp 24 irradiates a portion 5b of the reflective mirror 5 as shown in FIG. 2. The portion 5b is referred as a combined usage area.

In the headlight device 1, when the clearance lamp 24 is lit, a part of the light emitted from the lamp 24 is reflected at the combined usage area 5b of the main reflective mirror 5. Therefore, the clearance lamp 24 can irradiate sufficient light beam by a relatively small reflective mirror 26 and by a relatively small clearance lamp mounting space. The main lamp and the clearance lamp can emit sufficiently large amount of light beams respectively with a relatively amall overall dimension of the headlight device.

When the auxiliary lamp 24 is a fog lamp, it is preferred to arrange the optical axis of the reflective mirror 26 to incline in the downward direction so as to prevent the glare. Further, the fog lamp may be formed by utilizing a yellow colored glass on the bulb 24, or by utilizing a yellow filter.

FIG. 5 through FIG. 8 show a headlight device 27 of the second embodiment of the invention.

The headlight device 27 includes a lamp body 28 formed of a metal and having integrally a main reflective mirror 29 and a mounting portion 30 on one side of the main reflective mirror 29. An electric bulb 31 is mounted on generally central portion of the reflective mirror 29 to constitute a main light source, and an electric bulb 32 is mounted on the mounting portion 30 to constitute a clearance lamp as an auxiliary light source. A lens 33 is mounted on the lamp body 28 and covers the bulbs 31 and 32.

Figure 6:
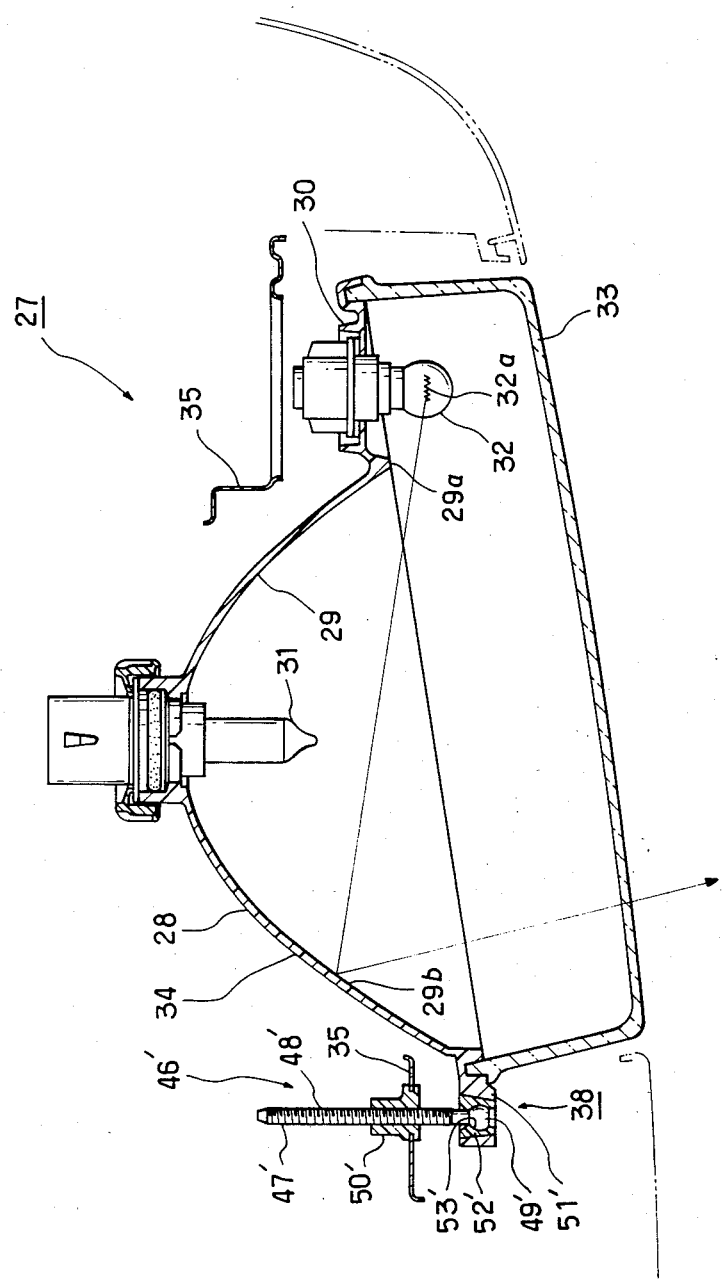
FIG. 6 is a section view taken along line VI—VI in FIG. 5.

One edge 29a of the reflective mirror 29 on the side adjacent to the mounting portion 30 is located rearward of the filament 32a of the bulb 32 such that the light emitted from the bulb 32 can be reflected by a major portion of the reflective mirror 29 on the side remote from the bulb 32 (the portion 29b acts as the combined usage portion) as shown in FIG. 6.

The lamp body 28, the reflective mirror 29, the mounting portion 30, the bulbs 31 and 32, and the lens 33 constitute a headlight unit 34.

Figure 5:
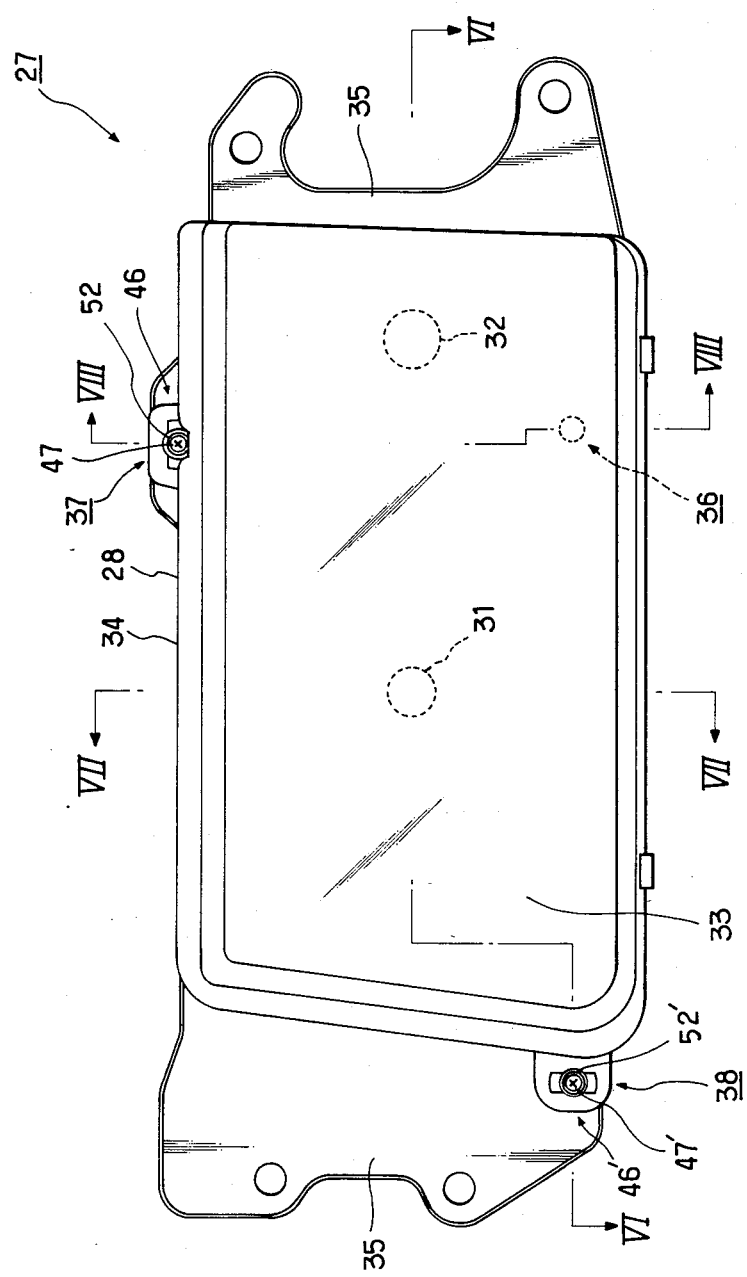
FIG. 5 is a front view of a headlight device according to a second embodiment of the present invention.

The headlight unit 34 is connected to a vehicle body 35 (which may be any suitable member secured to the vehicle body itself) at three points 36, 37 and 38. As shown in FIG. 5, the point 36 is located near to the lower right corner, the point 37 is located above the point 36 and near to the upper end, and the point 38 is located on the level equal to the point 36 and near to the left end. The headlight unit 34 is connected to the vehicle body 35 through a rotary supporting mechanism 39 at the point 36, and through respective aiming mechanisms 46 and 46' at the points 37 and 38 respectively.

The rotary supporting mechanism 39 comprises, as shown in FIG. 8, a bracket 40 provided on the vehicle body 35 to project forward, a supporting rod 41 fixedly mounted on the bracket 40 and having a spherical portion 42 on the tip end thereof integrally, a bracket 43 integrally formed on the rear surface of the lamp body 28 to project rearward, and a socket 44 formed of a synthetic resin material and having a spherical recess 45.

The spherical portion 42 is rotatably received in the spherical recess 45 in the socket 44 thereby forming the rotary supporting mechanism 39.

The aiming mechanism 46 at the point 37 (FIG. 8) and the aiming mechanism 46' at the point 38 (FIG. 6) have substantially the same constitution, thus, the aiming mechanism 46 will be explained in detail and, with respect to the aiming mechanism 46', the description will be omitted with corresponding parts being depicted by the same reference numerals with the prime attached.

An adjusting rod 47 has a screw-thread portion 48 extending along the substantial portion of the rod 47, and a spherical body 49 integrally formed on the front end of the screw-thread portion 48. The screw-thread portion 48 is threadingly extends through a nut 50 which is formed of a synthetic resin material and is supported on the vehicle body 35. A bracket 51 is provided on the rear surface of the lamp body 28 to project rearward. A socket member 52 formed of a synthetic resin material is supported on the bracket 51 and has a spherical recess 53 for engaging rotatably the spherical body 49 of the adjusting rod 47. Thus, the adjusting rod 47 having the spherical body 49, the nut 50 supported on the vehicle body 35 and the socket member 52 mounted on the bracket 51 and having the spherical recess 53 constitute the aiming mechanism 46.

In the aiming mechanism 46, when the adjusting rod 47 is rotated, the adjusting rod 47 moves forward or rearward relative to the nut 50 in response to the rotational direction of the rod 47 due to the screw-threading engagement between the nut 50 and the threaded portion 48 of the rod 47. The lamp body 35 inclines around a line connecting the points 36 and 38 on around a horizontal line as viewed in FIG. 5.

In the headlight device 27, the light emitted from the clearance lamp 32 is partly reflected by the combined usage area 29b of the main reflective mirror 29, thus, the size of the reflective mirror for use solely for the clearance lamp can be reduced, whereby the overall size of the headlight device can be reduced.

Similar to the first embodiment, the bulb 32 for the clearance lamp may be substituted by a fog lamp. In such case, it is advisable to provide a reflective mirror for the fog lamp, to incline the optical axis of the fog lamp downward and forward, and to use a yellow colored bulb or to mount a yellow colored filter on the bulb 32.

As described heretofore, the headlight device of the invention comprises a main reflective mirror associated with a main light source, an auxiliary light source mounted adjacent to one side edge of the main reflective mirror, and a lens covering the front side of the two light sources. And the one side edge of the main reflective mirror near to the auxiliary light source is located such that the light emitted from the auxiliary light source toward a portion near to the other side edge of the main reflective mirror, which being located remote from the auxiliary light source, is not shielded by the one side edge of the main reflective mirror. Thus, the light emitted from the auxiliary light source is irradiated through substantially the entire surface of the lens. Accordingly, the reflective mirror solely for the auxiliary light source may be ommitted or the size thereof can be reduced. And the overall dimension of the headlight device can be reduced.

It will be understood that the adjusting rods 18, 18', 47 and 47' in the aiming mechanisms of the embodiments may be rotated any suitable means associated with electronic control means.

What is claimed is:

1. A headlight device for an automobile comprising:
   a main reflective mirror portion for locating a main reflective mirror associated with a main light source;
   a mounting portion integral with and located outside the main reflective mirror portion and being provided with a sub-light source; and
   a lens covering the front side of the main and sub-light sources; and wherein
   an edge of an opening of the main reflective mirror at a side adjacent to the sub-light source is located such that light emitted from the sub-light source is not prevented from reaching a part of the main reflective mirror at a side remote from the sub-light source and adjacent to the front edge; and
   a portion of the light of the sub-light source is reflected by said part of the main reflective mirror and is projected forward;
   whereby sub-light of sufficient intensity can be provided without restricting the intensity of the main light.

2. A headlight device according to claim 1 wherein said auxiliary light source is used as a fog lamp.

3. A headlight device according to claim 1 wherein said auxiliary light source is used as a clearance lamp.

* * * * *